(12) United States Patent
Kitagata

(10) Patent No.: US 9,798,504 B2
(45) Date of Patent: Oct. 24, 2017

(54) IMAGE FORMING APPARATUS, CONTROL METHOD, AND STORAGE MEDIUM

(71) Applicant: CANON KABUSHIKI KAISHA, Tokyo (JP)

(72) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/217,829

(22) Filed: Jul. 22, 2016

(65) Prior Publication Data

US 2017/0031638 A1 Feb. 2, 2017

(30) Foreign Application Priority Data

Jul. 30, 2015 (JP) .................. 2015-150506

(51) Int. Cl.
*G06F 3/12* (2006.01)
*H04N 1/00* (2006.01)
*H04N 1/32* (2006.01)
*G06K 15/00* (2006.01)

(52) U.S. Cl.
CPC .......... *G06F 3/1236* (2013.01); *G06F 3/1206* (2013.01); *G06F 3/1217* (2013.01); *G06F 3/1265* (2013.01); *G06F 3/1267* (2013.01); *G06F 3/1287* (2013.01); *H04N 1/0023* (2013.01); *H04N 1/00214* (2013.01); *H04N 1/00244* (2013.01); *H04N 1/32523* (2013.01); *H04N 2201/3219* (2013.01)

(58) Field of Classification Search
CPC .... G06F 3/1236; G06F 3/1206; G06F 3/1217; G06F 3/1265; G06F 3/1267; G06F 3/1287; H04N 1/00214; H04N 1/0023; H04N 1/00244; H04N 1/32523; H04N 2201/3219
USPC ................... 358/1.1–1.18, 402, 403
See application file for complete search history.

(56) References Cited

U.S. PATENT DOCUMENTS

| | | | | |
|---|---|---|---|---|
| 8,995,002 | B2* | 3/2015 | McFarland | G06F 3/1206 358/1.15 |
| 2002/0024686 | A1* | 2/2002 | Uchiyama | G06F 3/14 358/407 |
| 2008/0037062 | A1* | 2/2008 | Omino | G06F 21/305 358/1.15 |
| 2012/0229844 | A1* | 9/2012 | Yada | H04N 1/0023 358/1.15 |
| 2013/0169993 | A1* | 7/2013 | Stein | G06Q 30/06 358/1.15 |

(Continued)

*Primary Examiner* — Gabriel Garcia
(74) *Attorney, Agent, or Firm* — Canon USA Inc., IP Division

(57) ABSTRACT

An image forming apparatus includes a printing unit connectable to a print server system with a print service providing print data. The image forming apparatus includes a reception unit that receives a URL from the print service in response to receipt of a print instruction, the URL indicating a location where the print data is stored and receives the print data based on the received URL, and a transmission unit that transmits the received print data to the printing unit. The transmission unit starts communication with the printing unit in response to receipt of partial print data, does not disconnect communication with the printing unit before receipt of a remainder of the print data finishes, and disconnects communication with the printing unit in response to completion of transmission of all of the print data.

11 Claims, 12 Drawing Sheets

(56) References Cited

U.S. PATENT DOCUMENTS

| | | | | |
|---|---|---|---|---|
| 2014/0185087 A1* | 7/2014 | Hayashi | ................ | G06F 3/122 |
| | | | | 358/1.15 |
| 2014/0213190 A1* | 7/2014 | Yamaoka | ............. | G06F 3/1204 |
| | | | | 455/41.3 |
| 2014/0240774 A1* | 8/2014 | Suzuki | ................ | G06F 3/1236 |
| | | | | 358/1.15 |

* cited by examiner

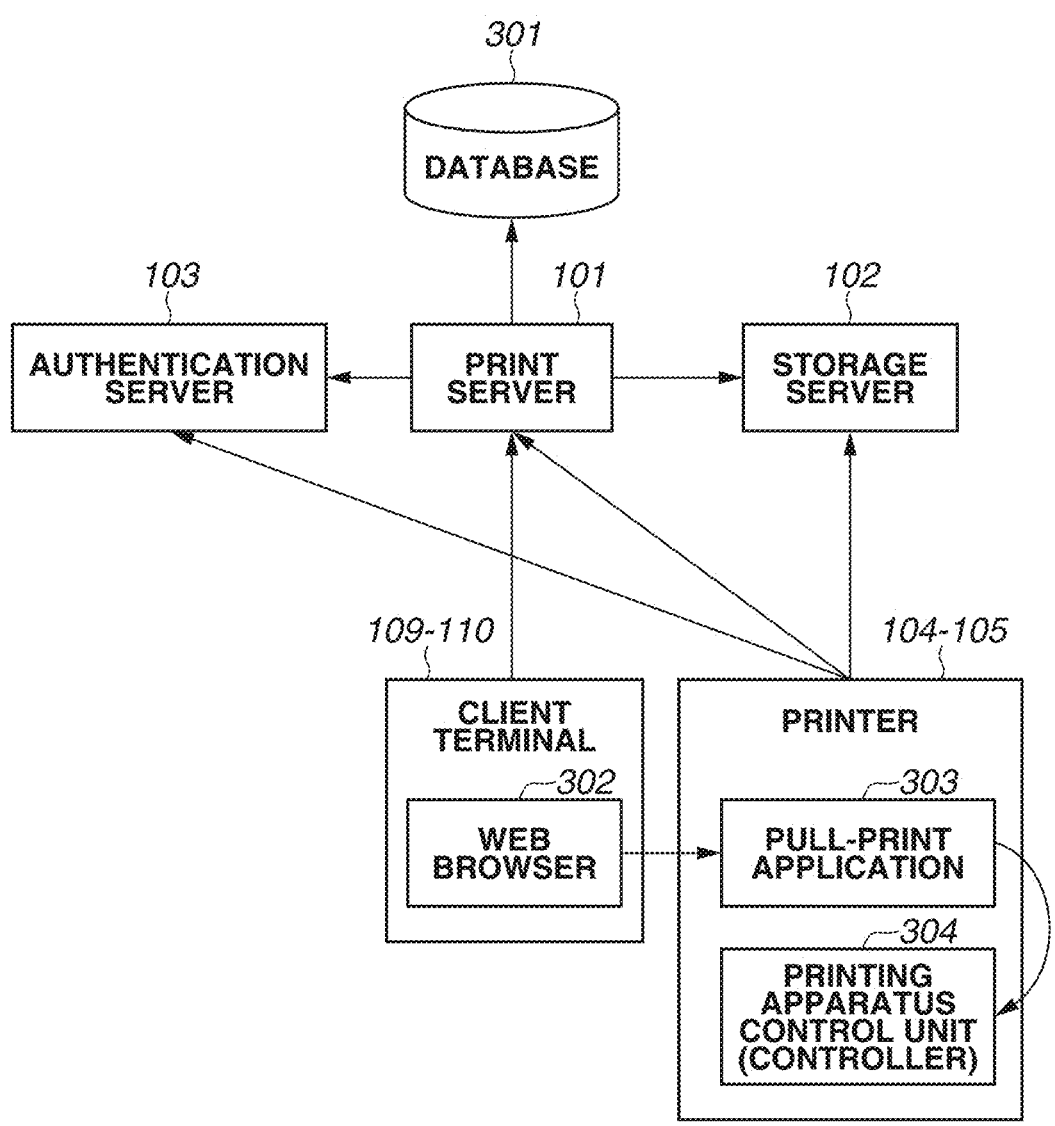

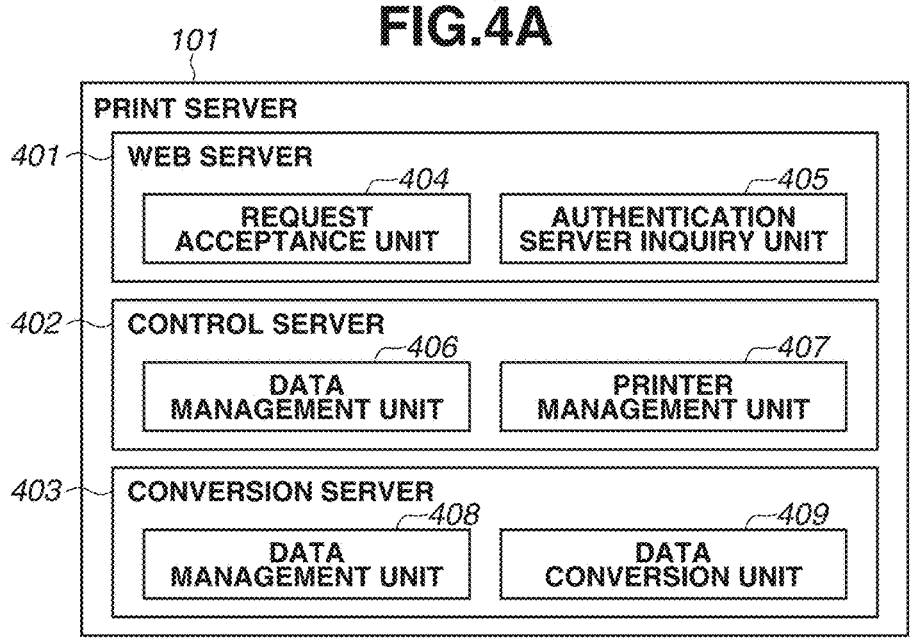
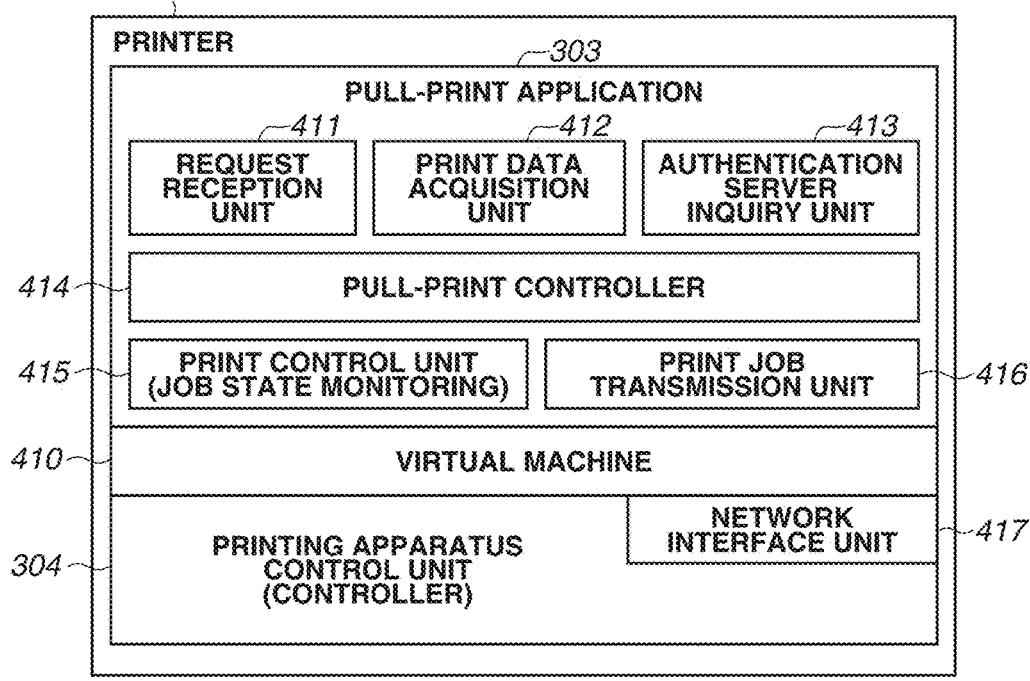

FIG.7

701 INDEX FILE (indexFile.xml)

```
{
  "version" : 1,
  dataList" : [
      "https://strage.srv.com/prt/93fc4966-8f68-4203-aa2f-
056f83d42402/printjobs/7dca6de2-aae2-40df-83e8-6327aa31d93b/data/data-
1.pdl?Policy=ppp&Sign=sss&KeyId=kkk",
      "https://strage.srv.com/prt/93fc4966-8f68-4203-aa2f-
056f83d42402/printjobs/7dca6de2-aae2-40df-83e8-6327aa31d93b/data/data-
2.pdl?Policy=ppp&Sign=sss&KeyId=kkk",
      "https://strage.srv.com/prt/93fc4966-8f68-4203-aa2f-
056f83d42402/printjobs/7dca6de2-aae2-40df-83e8-6327aa31d93b/data/data-
3.pdl?Policy=ppp&Sign=sss&KeyId=kkk"
    ],
  "end" : false
}
```

702 INDEX FILE (indexFile.xml)

```
{
  "version" : 1,
  "dataList" : [
      "https://strage.srv.com/prt/93fc4966-8f68-4203-aa2f-
056f83d42402/printjobs/7dca6de2-aae2-40df-83e8-6327aa31d93b/data/data-
1.pdl?Policy=ppp&Sign=sss&KeyId=kkk",
      "https://strage.srv.com/prt/93fc4966-8f68-4203-aa2f-
056f83d42402/printjobs/7dca6de2-aae2-40df-83e8-6327aa31d93b/data/data-
2.pdl?Policy=ppp&Sign=sss&KeyId=kkk",
      "https://strage.srv.com/prt/93fc4966-8f68-4203-aa2f-
056f83d42402/printjobs/7dca6de2-aae2-40df-83e8-6327aa31d93b/data/data-
3.pdl?Policy=ppp&Sign=sss&KeyId=kkk"
    ],
  "end" : true
}
```

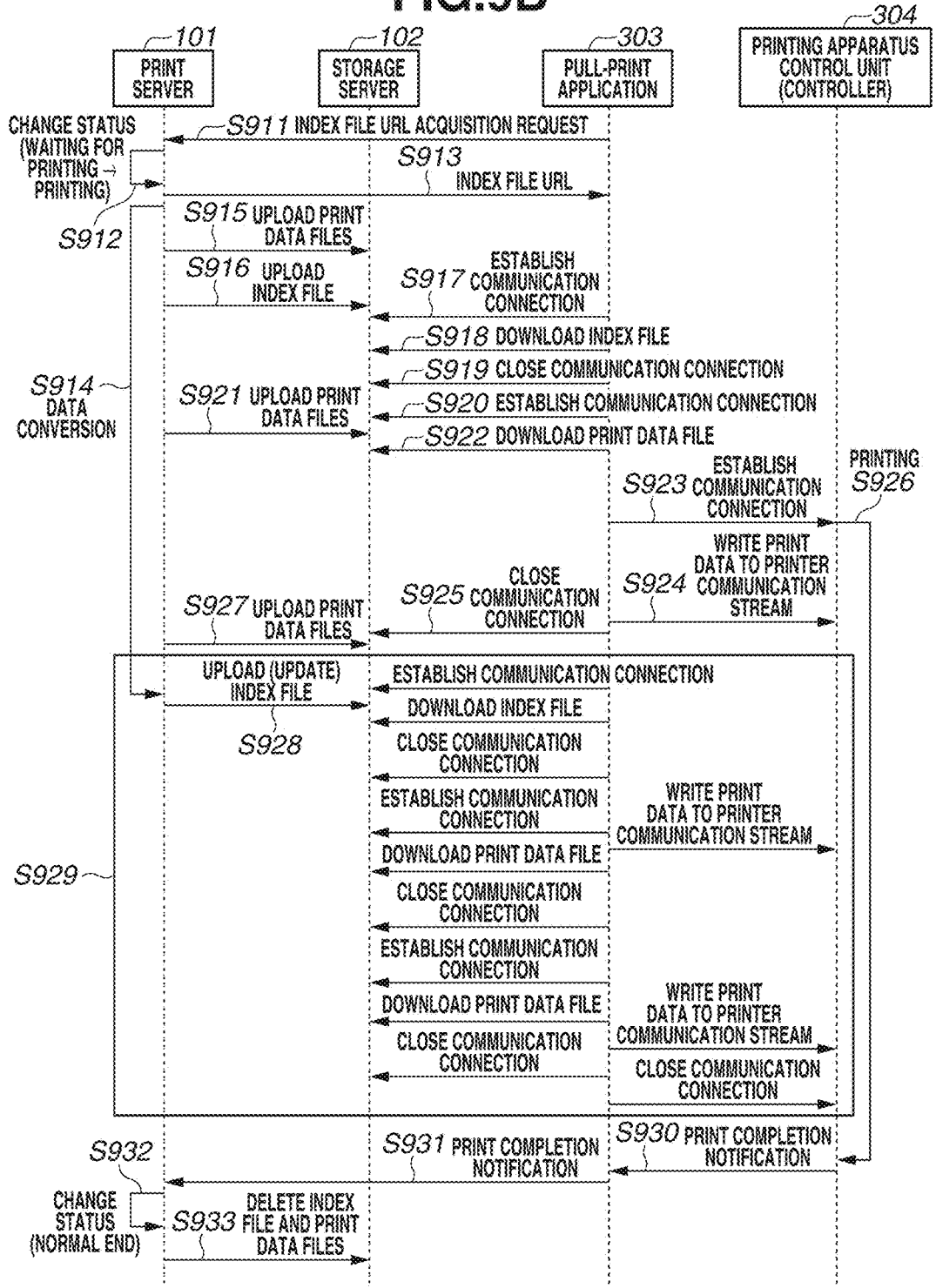

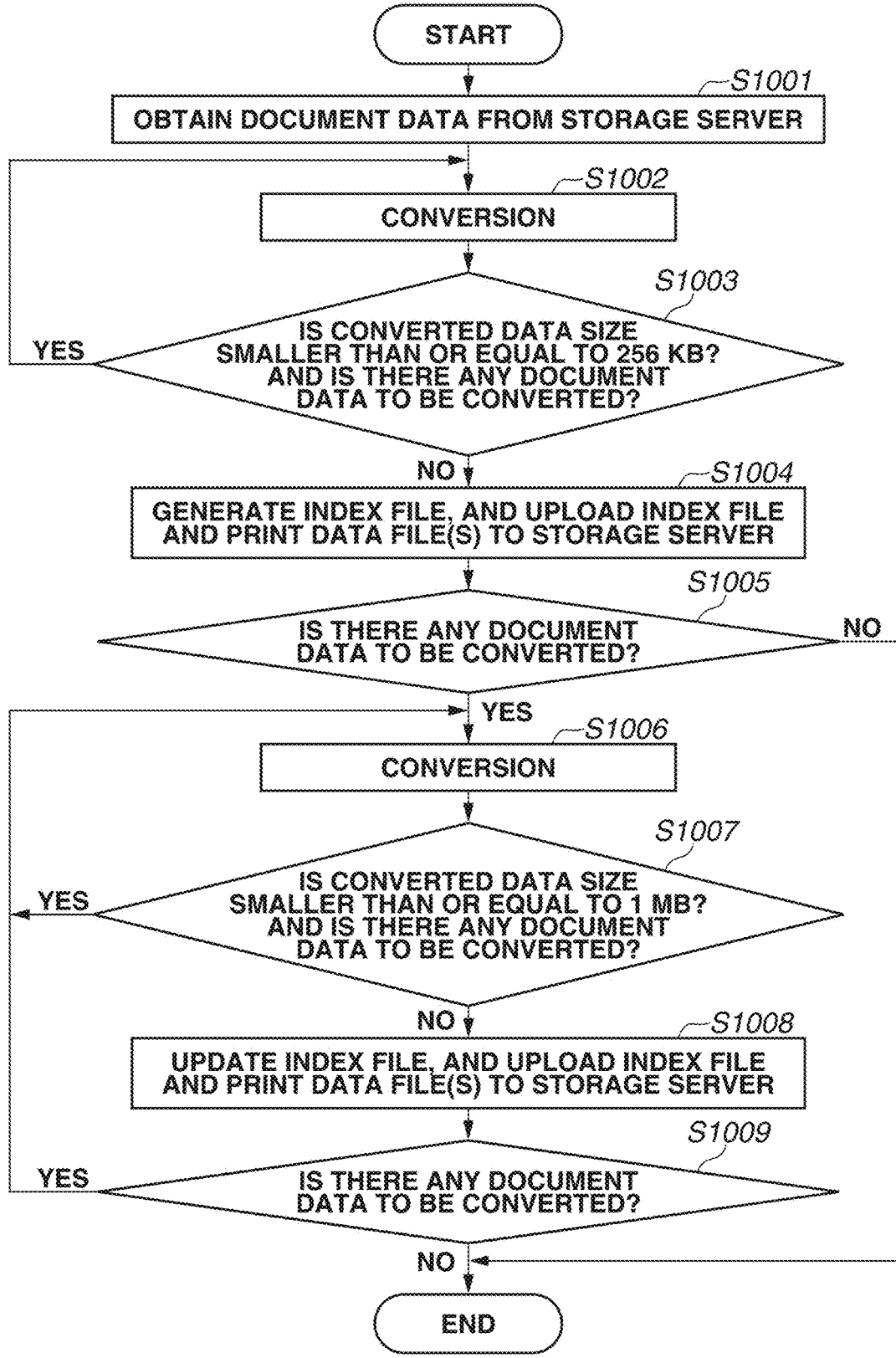

IMAGE FORMING APPARATUS, CONTROL METHOD, AND STORAGE MEDIUM

BACKGROUND

Field

Aspects of the present invention generally relate to an image forming apparatus that receives print data from a print service and prints the print data, a control method, and a storage medium.

Description of the Related Art

Businesses for connecting servers to the Internet and enabling the servers to provide cloud services have developed over recent years. Examples include a storage service for storing data in a file format and a database service for providing database functions. A printing system provided in the form of a print service or data conversion service on the Internet has also been desired.

The provision of services as cloud services is advantageous in that the servers can be located in a large-scale data center, which eliminates the need for customer-by-customer hardware management. Another advantage is that computing resources can easily be added according to the server load. As cloud services have become more widespread, demand has arisen for a pull-print environment in which print data is transmitted from a print server provided by a cloud service over the Internet and printed by a printer. Such a cloud service is mainly characterized by performing data processing of document data on the cloud side using a large amount of computing resources in a distributed manner to simultaneously process requests from various clients. A function of converting data into data formats interpretable by a wide variety of printers is thus important to the print server. This is because the data conversion that has conventionally been performed by data conversion drivers of client terminals can be performed by the cloud print server to implement cloud printing without a need for a client terminal. Japanese Patent No. 4509965 discusses such technique, whereby a printer integrates and prints pieces of print data into which a piece of print data is divided for the sake of conversion processing by a plurality of servers different for each document type.

If the number of pages or the number of copies to be printed of submitted document data is large, the print data increases in size and it takes a long for the image processing server discussed in Japanese Patent No. 4509965, which is a print server, to perform the data conversion processing. In such a case, the start of printing is delayed and the user is kept waiting because the printer is not able to start printing until all the print data included in the print job is converted.

For quick first print, a print server may be configured to sequentially transmit print data on completed pages to the printer for printing without waiting for the completion of all the print data. However, in such a configuration, a pull-print application arranged in the printer to obtain print data from the print server is expected to transmit the print data received from the print server to a controller for controlling a print engine via a communication port. Since the printer prints print data transmitted by one communication session as a single job, even the print data in the same print job is processed as that of different print jobs once the communication between the pull-print application and the controller is disconnected. If the conversion by the image processing server takes time, the connection between the pull-print application and the controller can be disconnected.

SUMMARY

According to an aspect of the present invention, an image forming apparatus, including a printing unit, connectable to a print server system including a print service for providing print data, includes a reception unit configured to receive a URL from the print service storing the print data in response to receipt of a print instruction, the URL indicating a location where the print data is stored and to receive the print data based on the received URL, and a transmission unit configured to transmit the print data received by the reception unit to the printing unit, wherein the transmission unit is configured to start communication with the printing unit in response to receipt of part of the print data by the reception unit, not disconnect the communication with the printing unit before the reception unit finishes receiving a remainder of the print data, and disconnect the communication with the printing unit in response to completion of transmission of the print data when the reception unit finishes receiving the remainder of the print data.

Further features of aspects of the present invention will become apparent from the following description of exemplary embodiments with reference to the attached drawings.

BRIEF DESCRIPTION OF THE DRAWINGS

FIG. 3 is a module configuration diagram of a printing system.

FIG. 4A is a software configuration diagram of the print server.

FIG. 4B is a software configuration diagram of a printer.

FIG. 7 illustrates examples of an index file.

FIG. 9B illustrates a print processing sequence of the web browser, the print server, and the pull-print application.

FIG. 10 illustrates a data conversion flow of the print server.

DESCRIPTION OF THE EMBODIMENTS

An exemplary embodiment of the present invention provides a mechanism that receives print data on a completed page to start printing for quick first print and by which the pull-print application transmits print data without disconnecting a communication session with the controller.

According to another exemplary embodiment of the present invention, a mechanism is provided which receives print data on a completed page to start printing for quick first print and by which the pull-print application transmits print data without disconnecting a communication session with the controller.

A mode for carrying out aspects of the present invention will be described below with reference to the drawings.

<Network Configuration>

Figure 1:
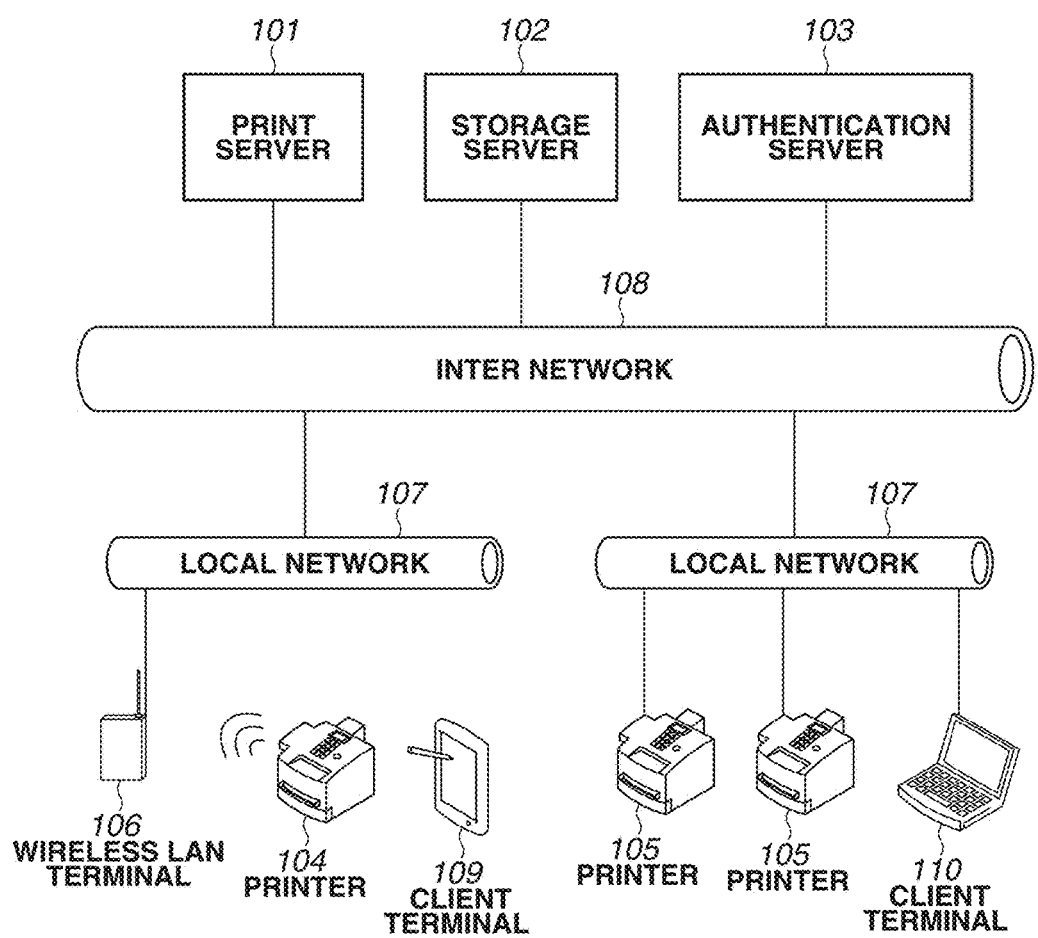
FIG. 1 is a block diagram illustrating a network configuration.

FIG. 1 is a diagram illustrating a network configuration of a printing system according to a first exemplary embodiment of the present invention. In FIG. 1, a plurality of printers 104 and 105 and a plurality of client terminals 109 and 110 are assumed to be connected via local networks 107. The printers 104 and 105 and the client terminals 109 and 110 can access an inter network 108 via the local networks 107 to access a print server 101, a storage server 102, and an authentication server 103. The printers 104 and 105 and the client terminals 109 and 110 are connected to the local networks 107 in a wired manner or via a wireless local area network (LAN). In the present exemplary embodiment, the printer 104 and the client terminal 109 are assumed to be connected to the local network 107 via a wireless LAN terminal 106. The wireless LAN terminal 106 is a wireless LAN base unit including a typical network router function and provides a wireless LAN. Examples of the networks 107 and 108 include, but are not limited to, the Internet, other LANs, a wide area network (WAN), a telephone line, a dedicated digital line, asynchronous transfer mode (ATM) and frame relay lines, a cable television line, a data broadcasting wireless line, etc. A communication network implemented by any combination thereof is also included. The networks 107 and 108 can transmit and receive data. The method of communication from the client terminals 109 and 110 to the print server 101 and the printers 104 and 105, and the method of communication from the printers 104 and 105 to the print server 101, the storage server 102, and the authentication server 103 may be different.

Examples of the client terminals 109 and 110 include, but are not limited to, a desktop computer, a notebook computer, a mobile personal computer, a personal digital assistant (PDA), etc. A mobile phone including a built-in program execution environment can also be used. The client terminals 109 and 110 include a built-in environment for executing a program such as a web browser (Internet browser, a world wide web (WWW) browser, a browser for use on the WWW, etc.). The print server 101 receives information identifying a document to be printed and information identifying a printer 104 or 105 to output from the web browser of a client terminal 109 or 110 along with a print request. The print server 101 returns a response including a command for issuing a print instruction to the web browser of the client terminal 109 or 110. The web browser of the client terminal 109 or 110 issues the received print command to the designated printer 104 or 105. If the printer 104 or 105 receives a print command from the web browser of the client terminal 109 or 110, the printer 104 or 105 obtains an index file 701 or 702 which describes a storage location of print data, including a universal resource locator (URL) of the storage server 102. Index files 701 and 702 will be described below. The printer 104 or 105 accesses the URL described in the index file 701 or 702 to obtain the print data from the storage server 102, and performs printing.

<Hardware Configuration of Print Server>

Figure 2A:
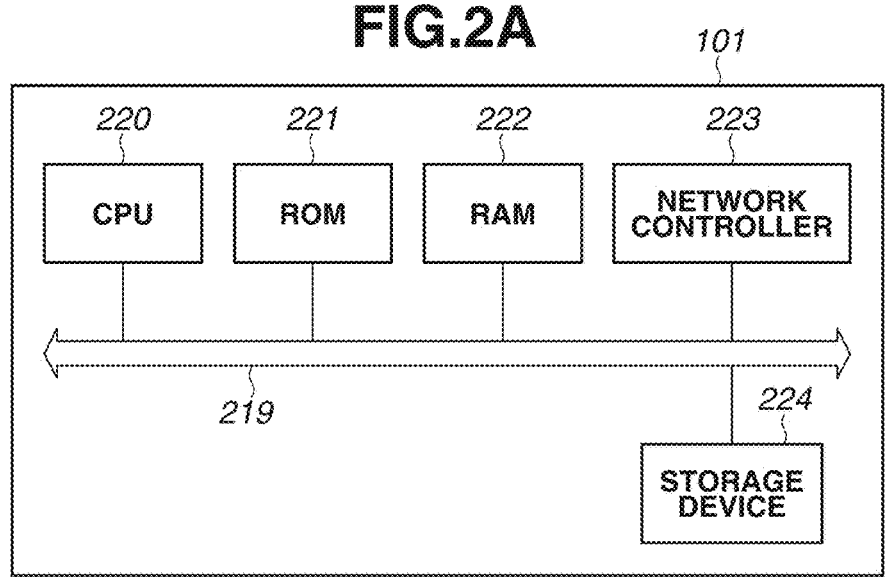
FIGS. 2A and 2B are hardware configuration diagrams of a print server and a printer.

FIG. 2A is a diagram illustrating an example of a hardware configuration of the print server 101. An exemplary embodiment of the present invention is applicable to either a single device or a system including a plurality of devices as long as the functions of the exemplary embodiment of the present invention can be executed. An exemplary embodiment of the present invention is applicable to a system that is connected to and performs processing via a network such as a LAN or a WAN as long as the functions of the exemplary embodiment of the present invention can be executed. In the present exemplary embodiment, the components will be described to be connected by a system bus 219.

A central processing unit (CPU) 220 is a control unit of an information processing apparatus. The CPU 220 executes application programs and an operating system of the print server 101 that are stored in a storage device 224. The CPU 220 performs control to temporarily store information and a file or files needed to execute the programs into a random access memory (RAM) 222. The CPU 220 performs conversion processing into print data according to a print server program. A read-only memory (ROM) 221 is a storage unit where programs such as a basic input/output (I/O) program, font data for use in data conversion into print data, and various types of data needed for print processing and data conversion processing are stored. The RAM 222 is a temporary storage unit, and functions as a main memory and a work area of the CPU 220. The storage device 224 functions as a large capacity memory. The storage device 224 stores the application programs and the OS.

<Hardware Configuration of Printer>

Figure 2B:
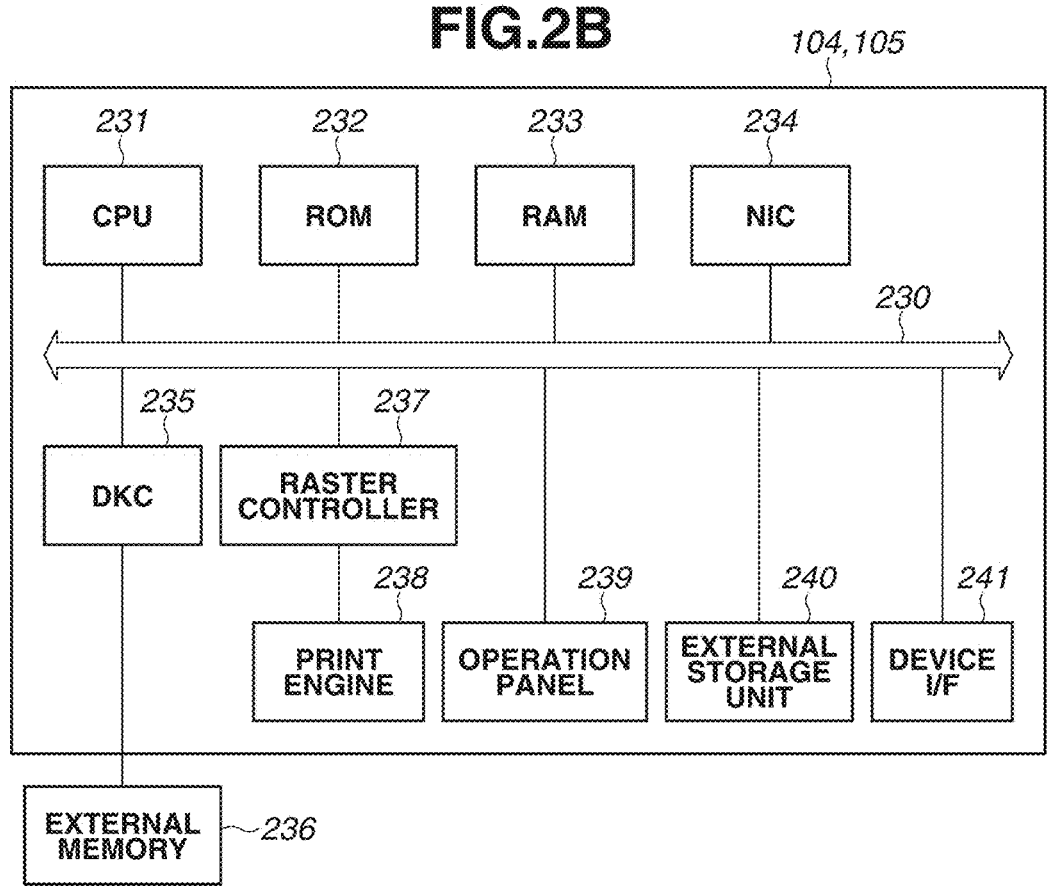

FIG. 2B is a hardware configuration diagram of the printers 104 and 105 that are image forming apparatuses. The hardware components are connected by a system bus 230. A CPU 231 controls the entire image forming apparatus. The CPU 231 controls access to various devices connected with the system bus 230 in a centralized manner. The CPU 231 performs control based on a control program stored in a ROM 232 or a control program and resource data (resource information) stored in an external memory 236 connected via a disk controller (DKC) 235. A RAM 233 functions as a main memory and a work area of the CPU 231. The RAM 233 is configured so that its memory capacity can be expanded by an optional RAM connected to an expansion port that is not-illustrated. An external storage unit 240 functions as a large capacity memory. An operation panel (operation unit) 239 displays a screen and accepts a user's operation instructions via the screen. The operation panel 239 further includes buttons and a display unit, such as a liquid crystal panel, enabling operations for setting an operation mode of the printer 104 or 105, displaying an operation status of the printer 104 or 105, and specifying contents to be printed. The printer 104 or 105 exchanges data with an external apparatus via a network interface card (NIC) 234. A print engine 238 illustrated in this diagram uses a known printing technique. Suitable examples include, but are not limited to, an electrophotographic method (laser beam method), an inkjet method, a sublimation (thermal transfer) method, etc. A raster controller 237 is a controller that converts print data in a page description language (PDL) into image data. A device interface (I/F) 241 is a connection I/F for enabling Universal Serial Bus (USB) connection with an external device.

<System Configuration>

FIG. 3 is a block diagram of the printing system according to the exemplary embodiment of the present invention. Operations of the servers, printers, and client terminals will be described using the block diagram of the printing system. Such operations are implemented by the respective CPUs executing programs stored in the memories of their respective apparatuses.

The print server 101 generates a URL indicating a submission destination of document data submitted by another service or program, and returns the URL to the service or program. The URL indicates the destination to which document data is uploaded in the storage server 102, including a storage service. The storage service can be included in the storage server 101, whereas the present exemplary embodiment deals with a case where the storage service is included in another server. If the service or program receives a print instruction from a user, the service or program uploads specified document data to be printed to the URL. If the print server 101 is notified of the print instruction/document data from the service or program, the print server 101 stores document information 620 about the submitted document data into a database 301. If the print server 101 receives a print request from a web browser 302, the print server 101 obtains document data linked with a document identifier (ID) 621, which is received with the print request, from the storage server 102 and performs conversion into print data based on the obtained document data. The print server 101 generates the print data and a download URL on the storage server 102. The print server 101 writes the download URL into the index file 701 or 702, uploads the print data to the download URL, and uploads the index file 701 or 702 to the storage server 102. The print server 101 implements a print service by combining such functions.

The authentication server 103 stores authentication information for accessing the print server 101. The authentication information includes, but is not limited to, a username, a password, an authentication token, an authorization token, etc. The print server 101 transmits an authentication token included in a request from the web browser 302 in the client terminals 109 and 110 to the authentication server 103 to verify authenticity of the authentication token. If the request from the web browser 302 does not include an authentication token, the print server 101 redirects the request to the authentication server 103. The authentication server 103 then returns a login screen 500 to the web browser 302. The authentication server 103 performs authenticity verification by verifying a username and password included in a login request from the login screen 500 displayed on the web browser 302 with usernames and passwords stored in the authentication server 103. If the verification succeeds, the authentication server 103 issues an authentication token linked with the user, and transmits a response to be redirected to the print server 101 to the web browser 302 along with the authentication token.

The web browser 302 transmits the request including the authentication token to the print server 101. The web browser 302 receives and displays a web screen 510, 520, or 530 depending on a response from the print server 101.

The authentication server 103 issues an authorization token needed for a pull-print application 303 in the printers 104 and 105 to access the print server 101. The authentication server 103 also performs authenticity verification on the authorization token included in a request when the pull-print application 303 accesses the print server 101.

The pull-print application 303 transmits a request including the authorization token to the print server 101, and obtains the index file 701 or 702 describing a URL representing print data. According to the URL representing the print data, the pull-print application 303 obtains the print data from the storage server 102 and transmits the print data to a printing apparatus control unit 304 for printing. The printing apparatus control unit 304 includes a function of performing printing on a recording medium based on the print data.

<Software Configuration of Print Server>

FIG. 4A is a software configuration diagram of the print server 101 according to the exemplary embodiment of the present invention. The software modules of the print server 101 are stored in the storage device 224 illustrated in FIG. 2A. As described above, the CPU 220 loads the software modules into the RAM 222 and executes the software modules. Here, an operation of the software modules of the print server 101 when the print server 101 receives an external request will be described.

The print server 101 includes a web server 401, a control server 402, and a conversion server 403. The web server 401 accepts an external request. The control server 402 manages documents, print jobs, and printer information, and controls print processing. The conversion server 403 converts document data into print data. The web server 401, the control server 402, and the conversion server 403 are respective independent programs and can be arranged in respective different information processing apparatuses. Such programs are arranged in respective information processing apparatuses connected to a network, and perform communication with each other. The programs can be arranged in the same information processing apparatus, which is the case in the exemplary embodiment of the present invention. Each server is arranged in a single-machine configuration or redundant configuration. That is, a single server may be configured by a plurality of information processing apparatuses. A print server system refers to a system including a print service configured by one or a plurality of information processing apparatuses.

The web server 401 receives submission of document data, a print request, or a print data acquisition request from another service, another program, the printers 104 and 105, or the web browser 302. If a request acceptance unit 404 receives a request from each client, an authentication server inquiry unit 405 transmits an authenticity verification request of a token to the authentication server 102. If the authenticity of the token is confirmed, the request acceptance unit 404 transmits the request from the client to the control server 402.

Figure 6:
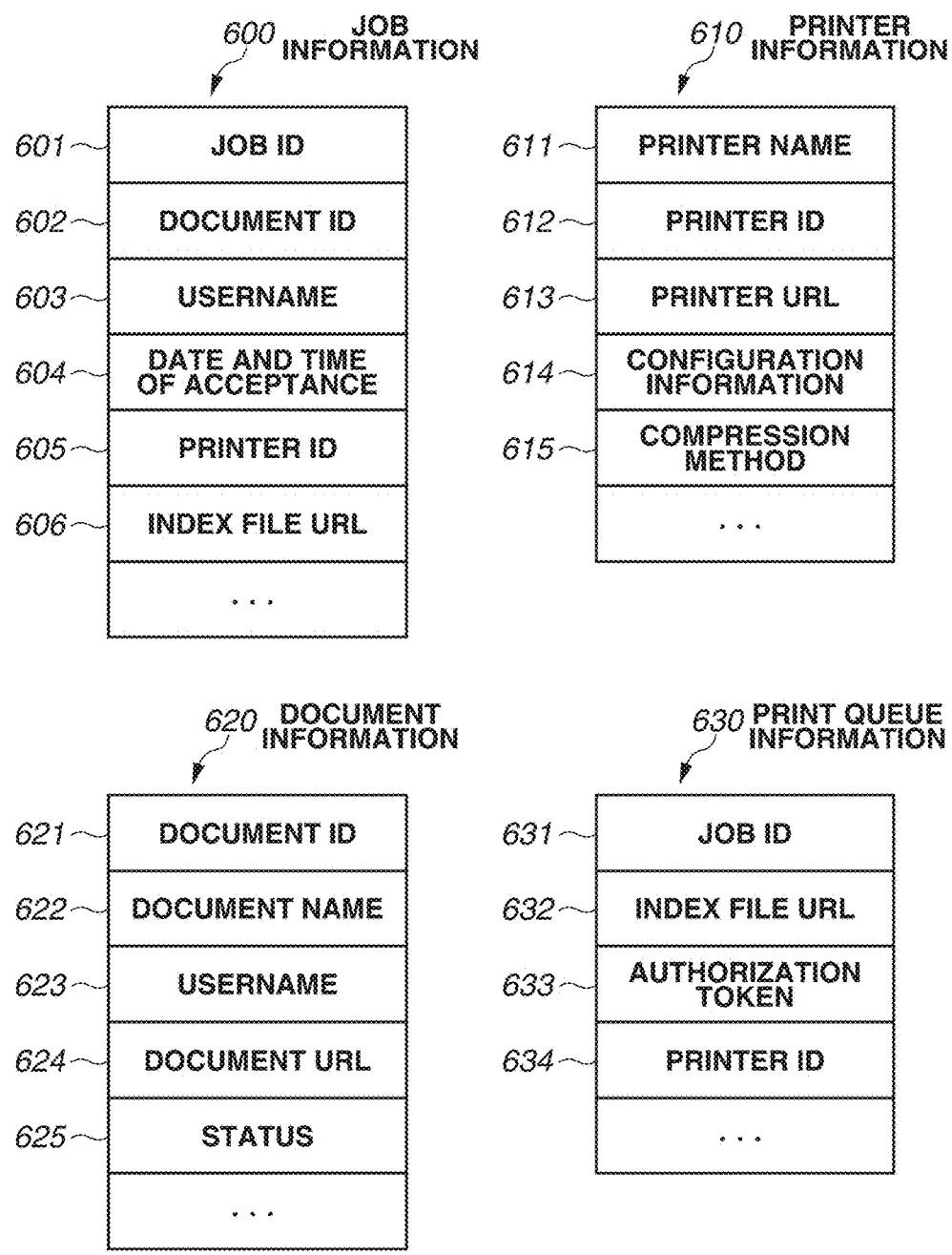
FIG. 6 illustrates data managed by the print server and a pull-print application.

If the control server 402 receives a submission request for document data, a data management unit 406 generates and stores document information 602 illustrated in FIG. 6 into the database 301. The document information 602 includes a document ID 621 for identifying the document data, a document name 622, a username 623 linked with an authentication token, a document URL 624 for uploading a document to the storage server 102, and a status 625. The document URL 624 includes the document ID 621. Possible values of the status 625 include, but are not limited to, "receiving," "on standby," "waiting for printing," "printing," "normal end," "error termination," and "unknown termination." The control server 402 changes the status 625 of the document information 602 to "receiving," and returns the document URL 624 to the web server 401. The web server 401 then returns the document URL 624 to the requesting service or program. If the service or program completes uploading the document data to the storage server 102, the service or program transmits an upload completion notification to the print server 101. If the web server 401 of the print server 101 receives the upload completion notification, the control server 402 changes the status 625 of the document information 602 to "on standby."

If the control server 402 receives a print request, the data management unit 406 generates job information 600 with respect to the print request, and stores the job information 600 into the database 301. The print request includes a document ID 621 of the document data to be printed, and a printer ID 612. The document ID 621 is linked with a document name 622 of document information 620 corresponding to a document name 512 on a document list screen 510 displayed on the web browser 302. The print ID 612 is linked with a printer name 611 of printer information 610 corresponding to a printer name 524 on a print setting screen 520 displayed on the web browser 302. The job information 600 generated by the data management unit 406 includes a job ID 601 identifying a print job, a document ID 602 corresponding to the document ID 621 of the document information 620, a username 603 linked with an authentication token, a date and time of acceptance 604 of printing, a printer ID 605 corresponding to the printer ID 612 of the printer information 610, and an index file URL 606.

The data management unit 406 obtains the printer information 610 corresponding to the printer ID 612 from the printer management unit 407, and passes configuration information 614, a compression method 615, the document URL 624, and the job ID 601 to the conversion server 403 to give an instruction for conversion into print data. The printer information 610 managed by the printer management unit 407 includes the printer name 611, the printer ID 612 for identifying the printer 104 or 105, a printer URL 613 for the web browser 302 to transmit a print request to the printer 104 or 105, the configuration information 614, and the compression method 615 indicating a compression method supported by the print data. The configuration information 614 indicates the functions of the printer 104 or 105. Whether the items of print settings 521 on the print setting screen 520 are operational can be determined from the configuration information 614. Examples of the functions include, but are not limited to, a two-sided function and a color function. The control server 402 returns a print script screen 540, in a script including the printer URL 613, the job ID 601, and the printer ID 605 as a print request command, to the web browser 302 via the web server 401. The web browser 302 transmits a print request to the pull-print application 303 of the printer 104 or 105 according to the script of the print script screen 540. If the print request to the pull-print application 303 succeeds, the web browser 302 notifies the print server 101. If the data management unit 406 receives the notification via the web server 401, the data management unit 406 changes the status 625 of the document information 620 to "waiting for printing."

If a data management unit 408 of the conversion server 403 receives a print data conversion instruction from the control server 402, the data management unit 408 downloads document data from the document URL 624 of the storage server 102. A data conversion unit 409 then converts the document data into print data, taking the configuration information 614 into account. The data conversion unit 409 forms a plurality of pieces of print data in a file format according to converted data size. Print data in a file format, or any other format, will be referred to as a print data file. If a certain number of print data files are generated by the data conversion unit 409, the data management unit 408 generates an associated number of print data file URLs on the storage server 102. The data management unit 408 then generates an index file 701 or 702 describing the print data file URLs. The above-described mechanism enables part of the print data to be generated according to the print instruction, to be first transmitted to the printer 104 or 105 for quick first print.

The data management unit 408 then generates an index file URL 606 on the storage server 102, and uploads the index file 701 or 702 and the plurality of print data files to the respective URLs. Here, the data management unit 408 performs conversion into a data format according to the compression method 615, and uploads the print data files to the storage server 102. The data management unit 408 transmits the index file URL 606 to the control server 402. The control server 402 registers the index file URL 606 in the job information 600 of the database 301. As soon as the data conversion unit 409 completes generating the rest of the print data files to be included in the print job, the data management unit 408 accordingly generates print data file URLs and generates an index file 701 or 702 describing the generated print data file URLs. The print data files are uploaded to the print data file URLs accordingly generated. The index file 701 or 702 is uploaded to the index URL 606 already generated.

<Web Screen>

Figure 5:
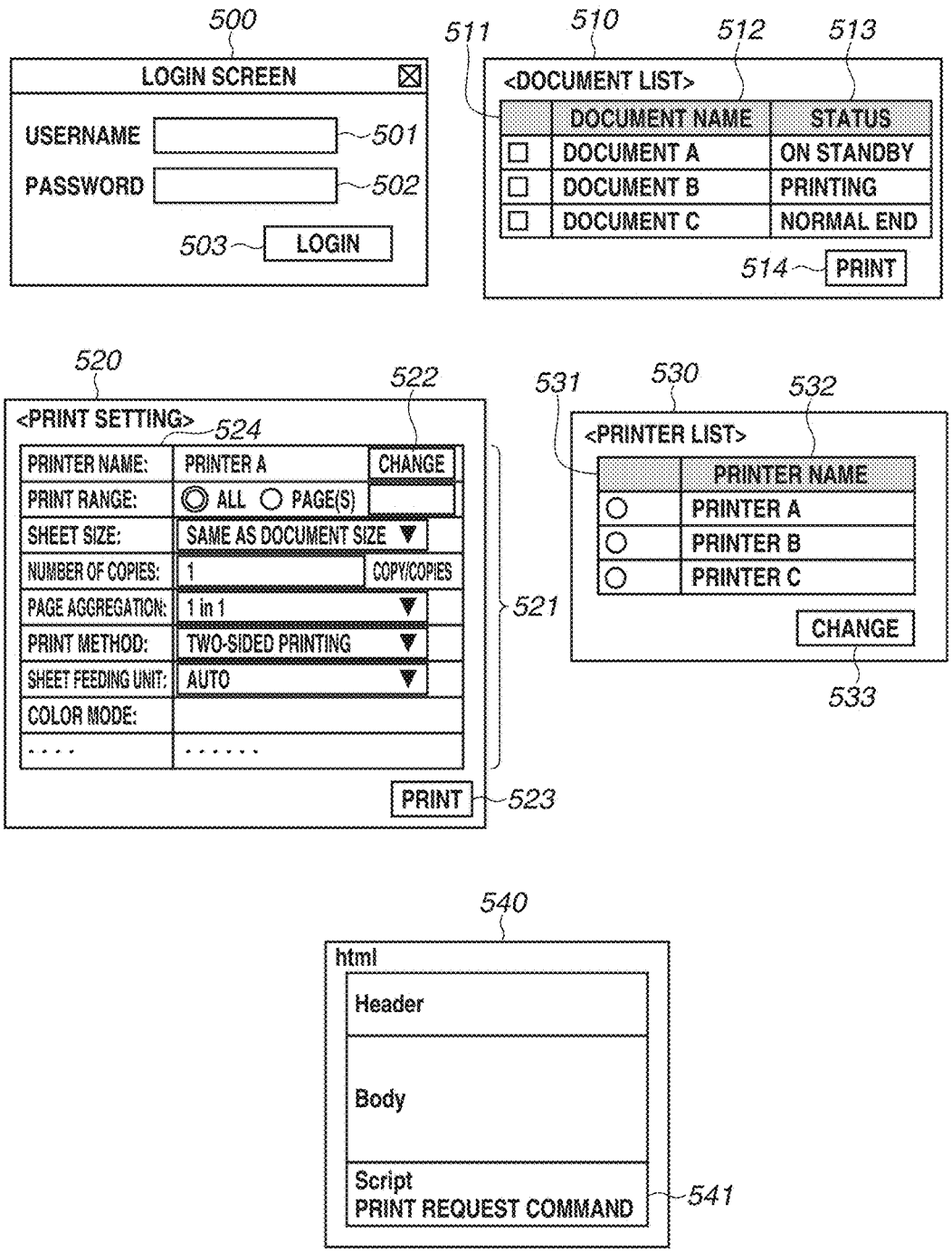
FIG. 5 illustrates examples of screens of a web browser.

FIG. 5 illustrates web screens that are generated by the web server 401 of the print server 101 according to the exemplary embodiment of the present invention and displayed by the web browsers 302 of the client terminals 109 and 110.

If the web browser 302 transmits a document list request to the print server 101, the print server 101 generates and transmits the document list screen 510 to the web browser 302. The document list screen 510 includes document selection checkboxes 511, the document name 512, a status 513, and a print button 514. The status 513 corresponds to the status 625 of the document information 620. The print server 101 generates the document list screen 510 using the status 625 at the time of reception of the document list request as the status 513 of the document list screen 510. The document selection checkboxes 511 are checkboxes to select a single document or a plurality of documents to be printed. Thus, one or a plurality of document selection checkboxes 511 may be marked. If the web browser 302 detects that the print button 514 is pressed, the web browser 302 transmits a list of documents associated with the marked document selection checkboxes 511 to the print server 101. Upon receipt of the document list, the print server 101 generates and transmits the print setting screen 520 to the web browser 302. The print setting screen 520 is a setting screen of print attributes 521. The printer name 524 indicates the printer to perform printing. If the web browser 302 detects that a change button 522 is pressed, the web browser 302 issues a request to the print server 101.

Upon receipt of the request, the print server 101 generates a printer list screen 530 from the printer information 610, and transmits the printer list screen 530 to the web browser 302. The printer list screen 530 includes printer selection radio buttons 531, a printer name 532, and a change button 533. If the web browser 302 detects that the change button 533 is pressed, the web browser 302 transmits the printer information 610 of the printer where the printer selection radio button 531 is selected to the print server 101. The print server 101 updates the printer name 524 of the print setting screen 520 with the printer name where the printer selection radio button 531 is selected, and transmits the print setting screen 520 to the web browser 302. If the web browser 302 detects that the print button 523 is pressed on the print setting screen 520, the web browser 302 transmits the print attributes 521, the printer name 524, and the list of documents where the document selection checkboxes 511 are selected on the document list screen 510 to the print server 101. The web browser 302 thereby makes a print request to the print server 101. The print setting screen 520 retains the list of documents where the document selection checkboxes 511 are selected on the document list screen 510 as hidden parameters.

<Software Configuration of Printers>

FIG. 4B is a software configuration diagram of the printers 104 and 105 according to the exemplary embodiment of the present invention. The software modules of the printers 104 and 105 are stored in the storage device 240 in FIG. 2B. As described above, the CPU 231 loads the software modules into the RAM 233 and executes the software modules. An operation of the software modules of the printers 104 and 105 when the printers 104 and 105 receive an external request will be described below.

The pull-print application 303 is application software running on a virtual machine 410. The pull-print application 303 is assumed to be installed afterward. The printers 104 and 105 on which the pull-print application 303 is installed can cooperate with the print server 101 including the print service.

A pull-print controller 414 of the pull-print application 303 performs operation management on the entire pull-print application 303. Operation instructions to various units are made via the pull-print controller 414.

If a request reception unit 411 of the pull-print application 303 receives a print request from the web browser 302, the request reception unit 411 notifies a print data acquisition unit 412 of print request information. The print request information includes the job ID 601 and the printer ID 605. The print data acquisition unit 412 manages acquisition of print data by using print queue information 630. The print queue information 630 is queue information about print job information, and includes, but is not limited to, a job ID 631, an index file URL 632, an authorization token 633, and a printer ID 634. The job ID 601 and the printer ID 605 transmitted from the web browser 302 are stored in the job ID 631 and the printer ID 634 of the print queue information 630. The print data acquisition unit 412 then issues an issuance request for an authorization token to an authentication server inquiry unit 413. The authentication server inquiry unit 413 issues an issuance request for an authorization token to the authentication server 103. The authentication server inquiry unit 413 transmits an already-registered certificate approved by the authentication server 103 to the authentication server 103. The authentication server 103 verifies the certificate, and if the authenticity is confirmed, issues and transmits an authorization token to the authentication server inquiry unit 413. The authentication server inquiry unit 413 transmits the authorization token to the print data acquisition unit 412. The print data acquisition unit 412 stores the authorization token in the authorization token 633 of the print queue information 630.

The print data acquisition unit 412 of the pull-print application 303 transmits an index file URL acquisition request for the first job ID 631 of the print queue information 630, to the print server 101. Here, the print data acquisition unit 412 transmits the index file URL acquisition request with the job ID 631, the printer ID 634, and the authorization token 633 included. The print server 101 identifies the index file URL 606 of the print job from the job ID 601 and the printer ID 605 of the job information 600, and returns the index file URL 606 to the pull-print application 303. The print data acquisition unit 412 stores the index file URL 606 in the index file URL 632 of the print queue information 630. The print data acquisition unit 412 then accesses the storage server 102 using the index file URL 632, and obtains the index file 701. The print data acquisition unit 412 obtains print data files corresponding to the print data file URLs described in the index file 701 from the print data file URLs on the storage server 102, described in the index file 701. If an end flag 703 in the index files 701 and 702 of FIG. 7 is false, it is indicated that the conversion processing of the print server 101 is still in process and a print data file URL or URLs will be added further. In such a case, the print data acquisition unit 412 obtains the index file URL 632 from the storage server 102 again as soon as the processing for obtaining the print data files corresponding to the URLs describing the print data files is completed. If the end flag 703 is true, all the print data has been obtained. In such a case, a print job transmission unit 416 closes a printer communication stream 802 as described below.

Figure 8:
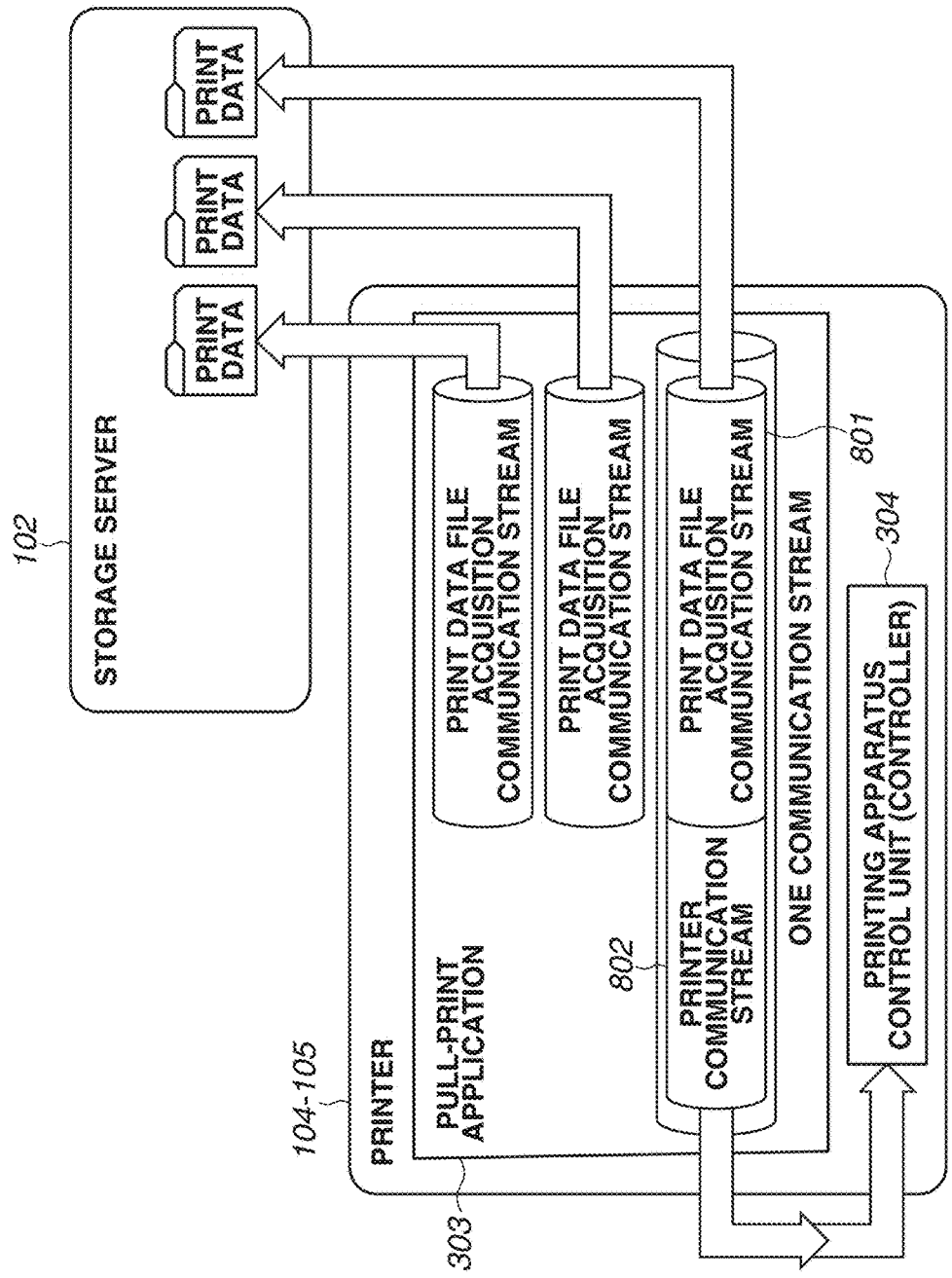
FIG. 8 is a conceptual diagram of a communication method of the pull-print application.

The print job transmission unit 416 accepts print data transmitted from the print data acquisition unit 412 and stores the print data in a transmission buffer stream. The print job transmission unit 416 then transmits the print data stored in the transmission buffer stream to the printing apparatus control unit 304 via a network interface unit 417. The print job transmission unit 416 stores part of the print data into the transmission buffer stream because the print job transmission unit 416 transmits print data to the printing apparatus control unit 304 while receiving print data from the storage server 102. This is due to the printing apparatus control unit 304 managing a single unit of a print job by using one communication connection with the network interface unit 417. That is, for quick first print, the print job transmission unit 416 needs to transmit the print job to the printing apparatus control unit 304 by one communication connection while receiving a plurality of print data files that are separately stored in the storage server 103. Such a mechanism will be described with reference to FIG. 8. FIG. 8 is a conceptual diagram in which the print job transmission unit 416 transmits print data of a print data file acquisition communication stream 801 to the printing apparatus control unit 304 by one communication connection while the print data acquisition unit 412 obtains a plurality of print data files from the storage server 102.

Initially, for a quick start of print processing of the printer 104 or 105, the print server 101 uploads converted print data to the storage server 102 in the form of a print data file as soon as the data conversion is completed. Early transmission of print data to the printing apparatus control unit 304 can start time-consuming preprocessing of the print engine 238 early, whereby first print of the printer 104 or 105 becomes quicker on the whole. As described above, the print job transmission unit 416 needs to transmit a print job to the printing apparatus control unit 304 by one communication connection. Then, the pull-print controller 414 maintains the print data file acquisition communication stream 801, by which the print data acquisition unit 412 communicates with the storage server 102, and the printer communication stream 802, by which the print job transmission unit 416 communicates with the network interface unit 417 of the printing apparatus control unit 304, as a single communication stream. When the print data acquisition unit 412 obtains the second or subsequent print data file, the pull-print controller 414 switches the connection of the existing printer communication stream 802 to a new print data file acquisition connection stream 801 generated by the print data acquisition unit 412 to maintain a single communication stream. In such a manner, the printer 104 or 105 can print a plurality of divided print data files as one print job while expediting first print. The print data file acquisition communication streams 801 are communications via the Internet. The print data file acquisition connection streams 801 use the Hypertext Transfer Protocol Secure (HTTPS) as the communication protocol. The printer communication stream 802 is an intra local network communication from the printer 104 or 105 to another port of the printer 104 or 105. The printer communication stream 802 uses a raw protocol as the communication protocol.

The operation of the software modules of the printers 104 and 105 when the printers 104 and 105 receive an external request has been described above.

<Print Start Flow>

Figure 9A:
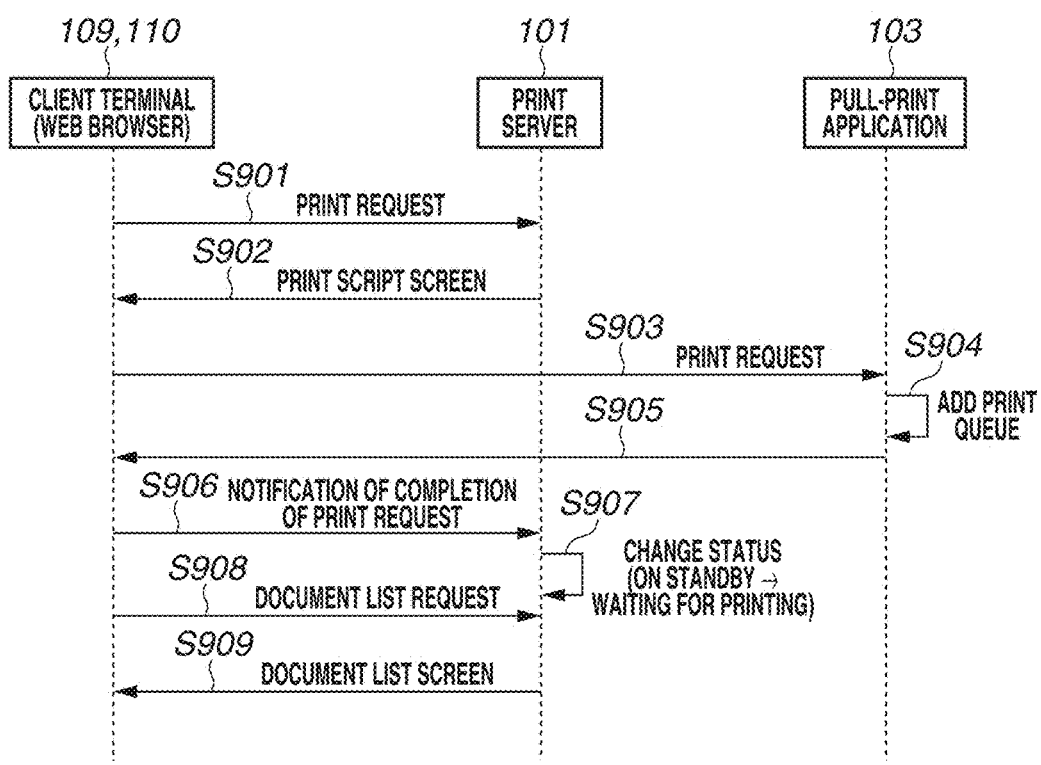
FIG. 9A illustrates a print start sequence of the web browser, the print server, and the pull-print application.

FIG. 9A illustrates a print start processing flow of the client terminals 109 and 110, the print server 101, and the pull-print application 303 according to the exemplary embodiment of the present invention. In step S901, the web browser 302 arranged in a client terminal 109 or 110 transmits a print request to the print server 101. The print server 101 generates and stores the foregoing job information 600 into the database 301. The conversion server 403 starts the conversion processing into print data. In step S902, the print server 101 transmits the print script screen 540 to the web browser 302. The web browser 302 executes the print script. In step S903, the web browser 302 transmits a print request to the pull-print application 303.

In step S904, the pull-print application 303 adds a print queue to the print queue information 630. In step S905, the pull-print application 303 sends a response to the web browser 302 that the print request is accepted. In step S906, the web browser 302 notifies the print server 101 of the completion of the print request. In step S907, the print server 101 changes the status 625 of the document information 620 to "waiting for printing." In step S908, the web browser 302 makes a document list request to the print server 101. In step S909, the print server 101 generates the document list screen 510 based on the document information 620, and returns the document list screen 510 to the web browser 302. The status 513 of the document list screen 510 here is "waiting for printing."

<Print Processing Flow>

FIG. 9B illustrates a print processing flow of the print server 101, the pull-print application 303, and the printing apparatus control unit 304 according to the exemplary embodiment of the present invention. In step S911, the pull-print application 303 receiving a print request from the web browser 302 issues an index file URL acquisition request to the print server 101. In step S912, the print server 101 changes the status 625 of the document information 620 to "printing." In step S913, the print server 101 returns the index file URL 606 to the pull-print application 303. If the conversion server 103 has not yet started the conversion processing of the designated document data, i.e., if there is no index file URL 606, the print server 101 returns a busy response. In such a case, the pull-print application 303 issues the index file URL acquisition request of step S911 again after a certain interval. The pull-print application 303 makes the inquiry on a regular basis until the index file URL 606 is obtained. Here, the print data conversion processing of the print server 101 from step S914 and the data acquisition processing of the pull-print application 303 with the storage server 102 in step S917 are performed in an asynchronous manner. That is, while in the present exemplary embodiment the processing of step S914 is started first, the processing of step S917 may be started first if there are many other print requests for the printers 104 and 105 requested of the print server 101.

In step S914, the print server 101 starts the processing for converting the document data into print data. In step S915, the print server 101 uploads generated print data files to the storage server 102. In step S916, the print server 101 uploads a generated index file 701 or 702 to the storage server 102. As the data conversion processing proceeds, in steps S921 and S927, the print server 101 further uploads print data files to the storage server 102. In step S928, the print server 101 uploads an updated index file 701 or 702 to the storage server 102.

In step S916, the print server 101 uploads the index file 701 or 702 to which the URLs of generated new print data files are added to the storage server 102 for update. In step S917, the pull-print application 303 establishes a communication connection for obtaining the index file 701 or 702 with the storage server 102. In step S918, the pull-print application 303 downloads the index file 701 or 702 from the storage server 102. In step S919, the pull-print application 303 closes the communication connection with the storage server 102. In step S920, the pull-print application 303 establishes a communication connection for obtaining print data with the storage server 102, and generates the print data file acquisition communication stream 801. In step S922, the pull-print application 303 starts to download print data from the storage server 102. In step S923, the pull-print application 303 establishes a communication connection with the printing apparatus control unit 304, and generates the printer communication stream 802.

In step S924, the pull-print application 303 connects the print data file acquisition communication stream 801 and the printer communication stream 802 into one communication stream, and starts transmitting the obtained print data files to the printing apparatus control unit 304. The transmission to the printing apparatus control unit 304 is implemented by writing the print data to the printer communication stream 802. If the pull-print application 303 completes obtaining one print data file from the storage server 102, then in step S925, the pull-print application 303 closes the communication connection with the storage server 102 and closes the print data file acquisition communication stream 801. Meanwhile, the printer communication stream 802 is not disconnected but left established. When the next print data file is downloaded and a print data file acquisition communication stream 801 is generated, the print data file acquisition communication stream 801 and the printer communication stream 802 are connected into one communication stream to maintain the communication connection with the printing apparatus control unit 304. Such a communication connection is maintained until all the print data included in the print job is transmitted to the controller (printing apparatus control unit 304) and the value indicating the end of conversion of the print job is included in the updated index file.

In step S926, the printing apparatus control unit 304 executes print processing to perform printing. The printing apparatus control unit 304 continues this print processing until all the print data files are generated and all the data is transmitted to the printing apparatus control unit 304 in step S929. If all the data has been transmitted, the pull-print application 303 closes the printer communication stream 802. In step S930, the printing apparatus control unit 304 transmits a print completion notification to the pull-print application 303. In step S931, the pull-print application 303 transmits the print completion notification to the print server 101. In step S932, the print server 101 changes the status 625 of the document information 620 to "normal end." If the completion status in step S930 is an error, then in step S932, the print server 101 changes the status 625 to "error termination." If the web browser 510 transmits a document list request, the status 513 changes to "normal end." In step S933, the print server 101 deletes the index file 701 or 702 and the one or plurality of print data files uploaded to the storage server 102. The above describes the print processing flow of the print server 101, the pull-print application 303, and the printing apparatus control unit 304.

<Print Server Print Data Conversion Flow>

FIG. 10 illustrates a print data conversion flow of the conversion server 403 of the print server 101 according to the exemplary embodiment of the present invention. In step S1001, the conversion server 403 obtains document data from the storage server 102. In step S1002, the conversion server 403 starts processing for converting the document data into print data. In step S1003, the conversion server 403 determines whether the converted data size is less than or equal to 256 KB and whether there is any document data to be converted. If the converted data size exceeds 256 KB (NO in step S1003), then in step S1004, the conversion server 403 generates a URL or URLs of a print data file or files, writes the URL(s) into an index file 701 or 702, and generates the print data file(s). The conversion server 403 then uploads the index file 701 or 702 and the print data file(s) to the storage server 102. The determination of step S1003 is not limited to such a condition. The converted data size may be increased or decreased. Whether the converted data size reaches one page may be determined.

In step S1005, if it is determined there is still document data to be converted (YES in step S1005), then in step S1006, the conversion server 403 continues data conversion. In step S1007, the conversion server 403 determines whether the converted data size is less than or equal to 1 MB and whether there is any document data to be converted. If the converted data size exceeds 1 MB (NO in step S1007), then in step S1008, the conversion server 403 generates a URL or URLs of a print data file or files, adds the URL(s) to the index file 701 or 702, and generates the print data file(s). The conversion server 403 then uploads the index file 701 or 702 and the print data file(s) to the storage server 102. In step S1009, if there is no more document data to be converted (NO in step S1009), the conversion server 409 completes the conversion processing. Like step S1003, the determination of step S1007 is not limited to such a condition. Since step S1007 is performed after first print, the data size or the number of converted pages is typically greater, in comparison with the condition of the determination of step S1003. The above describes the print data conversion flow of the conversion server 403. In such a manner, the print server 101 can transmit first-converted data to the printers 104 and 105 first, whereby first print can be made quicker on the whole.

As described above, the exemplary embodiment of the present invention provides the following effect. Print data on a completed page or pages can be received to start printing for quick first print while the pull-print application 303 can transmit the print data included in the print job to the controller in the printer 104 or 105 without disconnecting the communication session.

Figure 11:
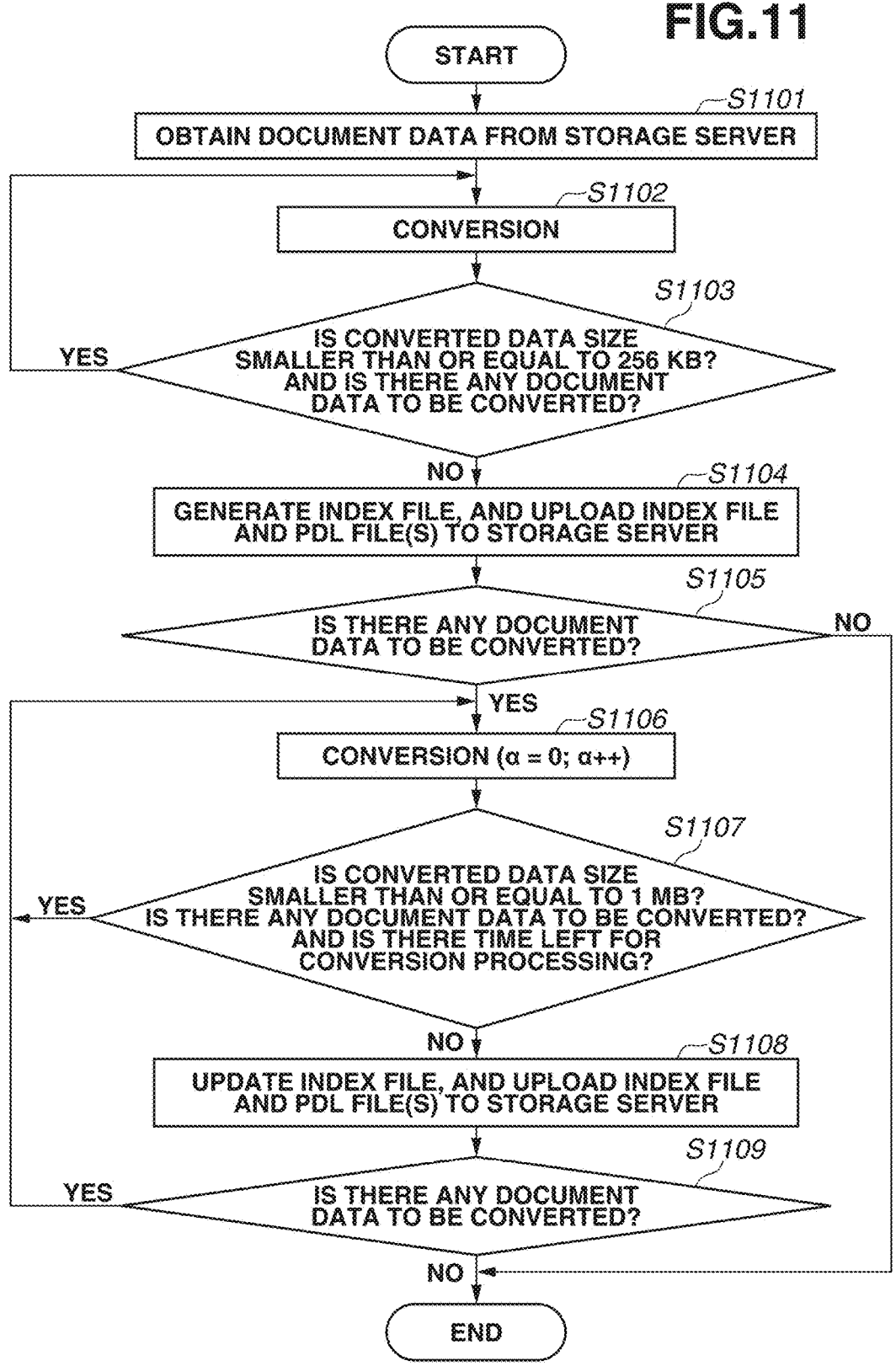
FIG. 11 illustrates a data conversion flow of the print server according to a second exemplary embodiment.

FIG. 11 illustrates a print data conversion flow of the conversion server 403 of the print server 101 according to a second exemplary embodiment of the present invention. As described in the first exemplary embodiment, to enable quick first print, a small amount of converted print data can be turned into a file and uploaded to the storage server 102. Uploading a large number of small-size files, however, increases the number of times of communication connections for obtaining the print data files from the pull-print application 303, with more frequent processing for establishing the communication connections. Frequently establishing Secure Sockets Layer (SSL) connections entails significant processing cost.

In view of the foregoing, print data files of smaller sizes are first uploaded to the storage server 102 for quick first print. Then, the size of print data files to be uploaded is gradually increased to reduce the total number of communications of the pull-print application 303.

Steps S1101 to S1106 are similar to the processing of steps S1001 to S1006 described in the first exemplary embodiment. A description thereof will thus be omitted. In step S1007 of FIG. 10, if converted data as high as a fixed value of 1 MB is generated, the converted data is uploaded to the storage server 102. In step S1107, the conversion size is a variable value. A data size 50% or 100% greater than the foregoing fixed value is used as the conversion size. The 50% or 100% may be modified by a value settable to a system. If the size of the generated converted data is not as large as the determined variable size value and there is no more document data to be converted or the conversion processing has taken longer than a certain time, the conversion server 403 transmits the converted data to the storage server 102. The reason is that the overall processing efficiency drops if the conversion processing takes long and the printer 104 or 105 is left idle. Steps S1108 and S1109 are similar to the processing of steps S1008 and S1009 described in the first exemplary embodiment. A description thereof will thus be omitted. In such a manner, unnecessary communication establishment processing of the pull-print application 303 can be minimized for efficient data download processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-150506, filed Jul. 30, 2015, which is hereby incorporated by reference herein in its entirety.

What is claimed is:

1. An image forming apparatus, including a printing unit and a pull-print application, connectable to a print server system including a print service for providing print data, the image forming apparatus comprising:

at least one processor and at least a memory coupled to the at least one processor and having stored thereon instructions which, when executed by the at least one processor, cause the at least one processor to function as:

a reception unit configured to receive a URL from the print service storing the print data in response to receipt of a print instruction, the URL indicating a location where the print data is stored and to receive the print data based on the received URL via a first communication session established between the print server system and the pull-print application; and a transmission unit configured to transmit the print data received by the reception unit to the printing unit, via a second communication session established between the pull-print application and the printing unit, wherein the printing unit prints the print data transmitted via one session of the second communication session as a single job;

wherein the transmission unit is configured to start communication with the printing unit in response to receipt of part of the print data by the reception unit, and the printing unit starts printing of the part of the print data, and wherein the transmission unit does not disconnect the second communication session with the printing unit before the reception unit finishes receiving a remainder of the print data, and disconnects the second communication session with the printing unit in response to completion of reception of the print data via the first communication session when the reception unit finishes receiving the remainder of the print data.

2. The image forming apparatus according to claim 1, wherein the reception unit is configured to receive a URL indicating a location where part of the print data is stored, receive the part of the print data based on the received URL, and perform processing for receiving a URL indicating a location where all or part of the remainder of the print data is stored.

3. The image forming apparatus according to claim 2, wherein the reception unit is configured to, if a URL indicating a location where part of the remainder of the print data is stored is received, repeat the processing for receiving a URL indicating a location where all or part of the remainder of the print data is stored, and repeat the processing until all the print data provided by the print service in response to the reception of the print instruction is received.

4. The image forming apparatus according to claim 1, wherein the reception unit is configured to receive, in addition to the URL, information indicating that all the print data related to the print instruction is provided by the print service, and wherein the transmission unit is configured to disconnect the communication with the printing unit in response to receipt of the information by the reception unit.

5. The image forming apparatus according to claim 1, wherein an application including the reception unit and the transmission unit is installed to cooperate with the print service.

6. A control method for controlling an image forming apparatus, including a printing unit and a pull-print application, connectable to a print server system including a print service for providing print data, the control method comprising:

receiving a URL from the print service storing the print data in response to receipt of a print instruction, the URL indicating a location where the print data is stored and receiving the print data based on the received URL via a first communication session established between the print server and the pull-print application; and transmitting the received print data to the printing unit via a second communication session established between the pull-print application and the printing unit, printing, by the printing unit, the print data transmitted via one session of the second communication session as a single job;

wherein transmitting the received print data includes starting communication with the printing unit in response to receipt of part of the print data and starts printing of the part of the print data, and not disconnecting the second communication session with the printing unit before finishing receiving a remainder of the print data, and disconnecting the second communication session with the printing unit in response to completion of reception of the print data via the first communication session when receiving the remainder of the print data finishes.

7. The control method according to claim 6, wherein receiving the print date further includes receiving a URL indicating a location where part of the print data is stored, receiving the part of the print data based on the received URL, and performing processing for receiving a URL indicating a location where all or part of the rest of the print data is stored.

8. The control method according to claim 7, wherein the receiving the print data further includes, if a URL indicating a location where part of the remainder of the print data is stored is received, repeating the processing for receiving a URL indicating a location where all or part of the remainder of the print data is stored, and repeating the processing until all the print data provided by the print service in response to the receipt of the print instruction is received.

9. The control method according to claim 6, wherein receiving the print data further includes receiving, in addition to the URL, information indicating that all the print data related to the print instruction is provided by the print service, and wherein transmitting the received print data includes disconnecting the communication with the printing unit in response to receipt of the information.

10. The control method according to claim 6, wherein an application including receiving the print data and the transmitting the received print data is installed to cooperate with the printing service.

11. A non-transitory storage medium storing computer executable instructions for causing an image forming apparatus, including a printing unit and a pull-print application, connectable to a print server system to implement a control method, the control method comprising:

receiving a URL from the print service storing print data in a storage service in response to receipt of a print instruction from a client terminal, the URL indicating a location where the print data is stored, and receiving the print data based on the received URL via a first communication session established between the print server system and the pull-print application; and transmitting the received print data to the printing unit included in the image forming apparatus via a second communication session established between the pull-print application and the printing unit, printing, by the printing unit, the print data transmitted via one session of the second communication session as a single job;

wherein transmitting the received print data includes starting communication with the printing unit in response to receipt of part of the print data, and the printing unit starts printing of the part of the print data, and, not disconnecting the second communication session with the printing unit before finishing receiving a remainder of the print data, and disconnecting the second communication session with the printing unit in response to completion of reception of the print data via the first communication session when receiving the rest of the print data finishes.

* * * * *